US009050862B2

(12) United States Patent
Mouchet

(10) Patent No.: US 9,050,862 B2
(45) Date of Patent: Jun. 9, 2015

(54) UNIVERSAL TIRE PRESSURE MONITORING SYSTEM TOOL AND METHODS

(71) Applicant: ATEQ Corporation, Livonia, MI (US)

(72) Inventor: Jacques Mouchet, Shanghai (CN)

(73) Assignee: ATEQ Corporation, Livonia, MI (US)

( * ) Notice: Subject to any disclaimer, the term of this patent is extended or adjusted under 35 U.S.C. 154(b) by 173 days.

(21) Appl. No.: 13/659,009

(22) Filed: Oct. 24, 2012

(65) Prior Publication Data

US 2013/0106596 A1    May 2, 2013

Related U.S. Application Data

(60) Provisional application No. 61/551,639, filed on Oct. 26, 2011.

(51) Int. Cl.
| | |
|---|---|
| *B60C 23/00* | (2006.01) |
| *B60R 25/10* | (2013.01) |
| *G06F 7/00* | (2006.01) |
| *G06F 19/00* | (2011.01) |
| *G01M 17/00* | (2006.01) |
| *B60C 23/02* | (2006.01) |
| *B60C 23/04* | (2006.01) |
| *G07C 5/08* | (2006.01) |
| *G07C 5/00* | (2006.01) |

(52) U.S. Cl.
CPC ............. *B60C 23/02* (2013.01); *B60C 23/0408* (2013.01); *G07C 5/0808* (2013.01); *G07C 5/008* (2013.01); *B60C 23/0472* (2013.01); *B60C 23/0479* (2013.01)

(58) Field of Classification Search
USPC .................. 340/442, 445, 426.33; 73/146
See application file for complete search history.

(56) References Cited

U.S. PATENT DOCUMENTS

| | | | |
|---|---|---|---|
| 4,398,172 | A | 8/1983 | Carroll et al. |
| 6,804,999 | B2 | 10/2004 | Okubo |
| 6,826,951 | B1 | 12/2004 | Schuessler, Jr. et al. |

(Continued)

FOREIGN PATENT DOCUMENTS

| | | |
|---|---|---|
| DE | 10050984 A1 | 5/2002 |
| DE | 102010026729 A1 | 1/2012 |

(Continued)

OTHER PUBLICATIONS

User Manual, ATEQ VT 55 version CAX-XX, published Nov. 1, 2009, XP002690038.*

(Continued)

*Primary Examiner* — Daniell L Negron
*Assistant Examiner* — Mohamed Barakat
(74) *Attorney, Agent, or Firm* — Young Basile Hanlon & MacFarlane P.C.

(57) ABSTRACT

Disclosed herein is an improved universal TPMS tool. According to one aspect of the tool, the tool can include a housing and a processor and a memory storage device positioned within the housing. The tool can optionally include a key pad positioned on the housing in communication with the processor for input of commands from a user, an electronic communication port positioned on the housing in communication with the processor, and an antenna for transmission and receipt of electronic information from the plurality of TPMS tire sensors. The tool can also include an optical scanner for reading indicia connected to the vehicle.

9 Claims, 12 Drawing Sheets

(56) References Cited

U.S. PATENT DOCUMENTS

| | | |
|---|---|---|
| 6,904,796 B2 | 6/2005 | Pacsai et al. |
| 6,980,115 B2 | 12/2005 | Deniau |
| 7,119,661 B2 | 10/2006 | Desai et al. |
| 7,250,852 B1 | 7/2007 | Kell |
| 7,564,344 B2 | 7/2009 | Deniau et al. |
| 7,589,619 B2 * | 9/2009 | DeKeuster et al. ......... 340/442 |
| 7,592,903 B2 * | 9/2009 | Kochie ......... 340/442 |
| 7,623,021 B2 | 11/2009 | Desai et al. |
| 7,688,192 B2 | 3/2010 | Kenny et al. |
| 7,694,557 B2 | 4/2010 | Hettle et al. |
| 7,734,391 B2 | 6/2010 | Deniau et al. |
| 7,810,390 B2 | 10/2010 | Hettle et al. |
| 7,924,148 B2 | 4/2011 | Costello et al. |
| 8,035,499 B2 | 10/2011 | Kochie et al. |
| 8,230,689 B2 | 7/2012 | Kmetz et al. |
| 8,502,655 B2 | 8/2013 | Deniau et al. |
| 8,576,060 B2 | 11/2013 | Deniau et al. |
| 2002/0092345 A1 * | 7/2002 | Van Niekerk et al. ......... 73/146 |
| 2002/0130771 A1 | 9/2002 | Osborne et al. |
| 2002/0149477 A1 | 10/2002 | Desai et al. |
| 2004/0150369 A1 | 8/2004 | Deniau |
| 2004/0236485 A1 | 11/2004 | Deniau et al. |
| 2005/0099812 A1 * | 5/2005 | Lee ......... 362/253 |
| 2005/0132792 A1 * | 6/2005 | Lemense et al. ......... 73/146.4 |
| 2005/0134428 A1 | 6/2005 | Desai et al. |
| 2006/0049915 A1 | 3/2006 | Deniau et al. |
| 2006/0211410 A1 | 9/2006 | Deniau et al. |
| 2006/0261933 A1 | 11/2006 | Deniau et al. |
| 2007/0090919 A1 | 4/2007 | Desai et al. |
| 2007/0090928 A1 | 4/2007 | Deniau et al. |
| 2007/0193349 A1 | 8/2007 | Petrucelli |
| 2008/0164988 A1 * | 7/2008 | DeKeuster et al. ......... 340/442 |
| 2008/0173082 A1 | 7/2008 | Hettle et al. |
| 2008/0191874 A1 * | 8/2008 | Walker et al. ......... 340/572.1 |
| 2008/0202659 A1 | 8/2008 | Hettle et al. |
| 2008/0204217 A1 | 8/2008 | Costello et al. |
| 2008/0205553 A1 | 8/2008 | Costello et al. |
| 2008/0266068 A1 | 10/2008 | Farrell et al. |
| 2008/0302425 A1 | 12/2008 | Hettle et al. |
| 2009/0000311 A1 | 1/2009 | Kmetz et al. |
| 2009/0033478 A1 | 2/2009 | Deniau et al. |
| 2009/0199629 A1 * | 8/2009 | Matsumura ......... 73/146.4 |
| 2011/0140876 A1 | 6/2011 | Deniau |
| 2011/0153367 A1 * | 6/2011 | Amigo et al. ......... 705/4 |
| 2012/0117788 A1 | 5/2012 | Deniau et al. |
| 2012/0119895 A1 | 5/2012 | Deniau et al. |
| 2012/0185110 A1 | 7/2012 | Deniau et al. |
| 2012/0302191 A1 | 11/2012 | Farrell et al. |
| 2013/0038440 A1 | 2/2013 | Deniau et al. |
| 2013/0038441 A1 | 2/2013 | Deniau et al. |
| 2013/0038442 A1 | 2/2013 | Deniau et al. |
| 2013/0038443 A1 | 2/2013 | Deniau et al. |

FOREIGN PATENT DOCUMENTS

| | | |
|---|---|---|
| EP | 1 223 057 A2 | 7/2002 |
| EP | 1769948 A2 | 4/2007 |
| EP | 1972468 A1 | 9/2008 |
| EP | 2 095 944 A1 | 9/2009 |
| JP | 2008100613 A | 5/2008 |
| WO | 9308035 | 4/1993 |
| WO | 0236368 A1 | 5/2002 |
| WO | 2008000491 A1 | 1/2008 |
| WO | 2010115390 A1 | 10/2010 |

OTHER PUBLICATIONS

Jacques Mouchet, ATEQ User Manual ATEQ VT 55, Retrieved on Jan. 10, 2013 from the internet: www.orange-electronis,com/en/products/oe_sensor/VT55d-UOS.pdf, Nov. 1, 2009, pp. 1-38.

European Intellectual Property Office, International Search Report and Written Opinion, dated Dec. 20, 2013.

European Intellectual Property Office, International Search Report and Written Opinion, dated Mar. 12, 2014.

* cited by examiner

UNIVERSAL TIRE PRESSURE MONITORING SYSTEM TOOL AND METHODS

CROSS REFERENCE TO RELATED APPLICATION

The present application claims priority benefit to U.S. provisional patent application Ser. No. 61/551,639 filed Oct. 26, 2011, the entire contents of which are incorporated herein by reference.

TECHNICAL FIELD

The present invention is in the general field of monitoring pressure and other conditions of pneumatic tires and other systems on vehicles.

BACKGROUND

In 2007, the United States federal laws implemented and required most passenger vehicles to include a tire pressure monitoring system (TPMS) to monitor and alert drivers of low tire pressure which degrades vehicle efficiency and performance. Continued use of a tire with low tire pressure can cause premature wear of the tire and in the worst case, catastrophic tire failure.

One TPMS system is Direct TPMS. In direct TPMS, a tire sensor is installed in the wheel, often the valve stem of pneumatic vehicle tire. These sensors are capable of monitoring several conditions of the tire including: tire air pressure, tire temperature, wheel rotation speed and other conditions. The sensors themselves include a specific sensor identification code (ID) and are capable of receiving electronic signals and sending electronic signals wirelessly from inside the wheel to an electronic control unit or module (ECU) in the vehicle which typically is connected to alert signals in the instrument panel in the interior of the passenger compartment. If a wheel sensor signals a tire pressure or other condition in a tire that is above or below a predetermined level, the sensor transmits a signal that is received by the ECU and an audio/visual indication is triggered to alert the driver to the condition.

Typical tire sensors used with TPMS systems are mounted on the valve stem, strapped on the rim or they could also be mounted against the tire wall. The electronic module generally includes a small battery, a circuit board with communication antennas or coils (receive and transmit), an air pressure sensor, a temperature sensor, a rotation detection device or accelerometer, a programmable controller and a memory for storing the sensor specific ID and other information depending on the TPMS system and capabilities. Modules that do not include a battery are under development. Due to the installation inside the tire or valve stem, sensors are designed to be permanently installed within the tire. Due to the finite life of batteries, power consumption is purposely low and the sensors are initially placed in a "sleep" mode so as to not use power until the vehicle or individual wheel is installed or sold to an end user. During operation of the vehicle in the field, it is common for the sensors to not be active or continuously reporting information to the vehicle ECU, but rather to perform tire condition checks at predetermined intervals to conserve battery life. When activated, the sensors emit a signal or signals which are received and interpreted by the ECU and processed according to preprogrammed instructions.

As TPMS systems advance in capability and increased safety options are included by the vehicle original equipment manufacturers (OEMs), vehicles are capable of identifying or alerting of the specific tire that, for example, may have low tire pressure. These systems accomplish this through the vehicle ECU being initially programmed or calibrated to recognize each of the specific wheel sensors associated with a particular position on the vehicle, for example, driver front or rear and passenger front or rear. When a new vehicle is manufactured, this initial programming or calibration may take place in the vehicle assembly plant or at a later time before the vehicle is purchased or delivered to the end user.

When, for example, the tires on the vehicle are "rotated" and their positions on the vehicle change as part of routine maintenance for longevity of tire life, it is important for the proper operation of the TPMS that the vehicle ECU be reprogrammed or calibrated to take into account that the prior position of the tires, and associated tire sensors, has changed.

TPMS tools have been developed which can wirelessly identify the specific sensor ID in the particular tires and transmit electronic signals to the vehicle ECU to update or retrain (reprogram) the vehicle ECU/TPMS so the vehicle reports accurate tire conditions to the driver. This process is needed on many other vehicle wheel events, for example, when a full different set of wheels is installed on a vehicle to replace summer tires and switched with winter tires, which is common in northern states and foreign countries. Other examples include when a single tire pressure sensor is replaced due to damage. In each instance, the TPMS needs to be updated and the ECU retrained or reprogrammed to take into account the change in wheel or wheels and the respective different TPMS wheel sensor.

In a conventional use of a TPMS tool, for example when the existing vehicle wheels are rotated in a commercial service garage as described above, the TPMS tool is sequentially brought into close proximity to the exterior of each tire. For each tire, the TPMS sends an electronic signal which is received by the adjacent sensor to activate, trigger or awaken the sensor which is in an inactive sleep mode to conserve battery power. The sensor awakens and transmits a predetermined signal or signals providing the sensor ID and other preselected information.

Depending on the type of TPMS tool, basic TPMS tools will activate the sensor to force it to transmit internal sensor information, internally process the data, and send a signal or signals to the ECU to "reset" or reprogram the ECU to account for the different location of existing sensors or new sensors. An example of such a tool is the ATEQ model VT15 manufactured by ATEQ, assignee of the present invention, and which is incorporated herein by reference. More sophisticated TPMS tools include additional features to decode the signals transmitted by the sensors to the ECU. This may include reading and displaying the information on a tool visual display for the service garage technician. This decoding may include, for example, the sensor data on tire air pressure, tire air temperature, tire rotational speed, remaining sensor battery life or condition depending on the type of sensor or TPMS tool. The TPMS tool stores the information in memory, processes the received information according to preprogrammed instructions in the tool, and transmits a signal or signals to the ECU to reprogram the ECU for the changed wheel and sensor event. An example of such a tool is the ATEQ model VT55 manufactured by ATEQ Corporation, assignee of the present invention and which is incorporated herein by reference. The decoding of information is useful as a diagnostic tool to identify the particular tire condition to better troubleshoot problems. An easy example would be to specifically identify which sensor is transmitting an alert condition or identify a sensor that has stopped working due to a dead battery or damage.

BRIEF SUMMARY

The present invention provides examples of improvements to existing TPMS tools including additional components, features, functions and methods of operation described below.

The improved universal TPMS tool disclosed herein can be used with a vehicle that includes an electronic control unit (ECU) in communication with a plurality of TPMS tire sensors each operable to detect one or more conditions of a vehicle tire installed on the vehicle and to transmit tire condition data to the ECU.

According to one aspect of the tool, the tool can include a housing and a processor and a memory storage device positioned within the housing. The tool can optionally include a key pad positioned on the housing in communication with the processor for input of commands from a user, an electronic communication port positioned on the housing in communication with the processor, and an antenna for transmission and receipt of electronic information from the plurality of TPMS tire sensors. The tool can also include an optical scanner for reading indicia connected to the vehicle. The indicia may, for example, include informational data such as TPMS tire sensor identification information unique to a particular TPMS tire sensor.

The scanner can be configured to directly read the indicia, and store the information data for future reference and use. The tool can use the stored data for a number of functions that are highly useful for maintenance personal and other users of the tool. For instance, in one example, the tool can use the stored identification information to clone a TPMS tire sensor. In another example, the tool can include in memory, or otherwise have access to, programming instructions for a wide variety of different TPMS tire sensors. The tool can use the stored data to identify the make of a TPMS tire sensor to be programmed or reprogrammed. The tool can then activate the TPMS tire sensor to enable the TPMS tire sensor to receive data, and transmit the correct programming instructions to the TPMS tire sensor according to its make or desired operation.

In another example, the tool can use the stored data to filter tire condition signals transmitting from multiple TPMS tire sensors and picked up by the tool. Here, the tool can use the TMPS tire sensor identification information of a particular TPMS tire sensor to correlate a subset of the tire condition signals to the particular TPMS tire sensor. This can be repeated for all TPMS tire sensors, such that the tire condition data can be associated to a particular TMPS tire sensor, and thus, to a particular tire of the vehicle. This information can optionally be displayed to a user of the tool using a built-in display or through communication with a peripheral device such as a smart phone or computer.

In addition to the tire sensor being reprogrammable, the ECU can be configured for reprogramming to account for tire rotation, tire switching, etc. In this example, the tool can transmit the TMPS tire sensor identification information of a particular tire sensor to the ECU, which can be reprogrammed in conjunction with user instructions communicated through the tool. In this way, the ECU can associate a number of particular TPMS tire sensors with a tire position on the vehicle.

The scanner can also be used to scan other indicia, for example a vehicle indicia, to receive any manner of identification information regarding the vehicle. In one example, the tool optical scanner can scan, optically read or image and process, for example through optical character recognition (OCR) techniques, the vehicle identification number (VIN) and/or vehicle license plate number. This information can also optionally be displayed to a user of the tool using a built-in display or through communication with a peripheral device such as a smart phone or computer.

An aspect of a system incorporating the improved tool may include a OBD module that can connect to a communication port on the tool to store information scanned or transmitted to the tool (e.g., the data from a scanned TPMS tire sensor indicia or vehicle indicia, or data transmitted to the tool from the TPMS tire sensors or other sensors of the vehicle). The OBD module can be removed from the tool and connected through a cable connection to an ODBII communication port on the vehicle. In this manner, the stored information can be communicated to the ECU without physically connecting the tool to the vehicle. This greatly reduces risk of loss of the tool arising from, for example, maintenance personnel in a garage forgetting to remove the tool from the vehicle.

In conventional vehicles, the ECU is typically includes or is connected with a number of vehicle warning or status systems. Signals that correspond to warnings, status, etc. are communicated to the ECU, or are generated by the ECU itself, for use by the ECU. The tool may be configured to communicate with the vehicle to retrieve and decode these signals. The aforementioned display can be used display this information to in a user readable form, for example, or the tool can be configured to communicate with a peripheral device such as a smart phone or computer to display this information.

It will be understood that these and other advantageous features of the improved TPMS tool can be practiced alone in combination with each other.

BRIEF DESCRIPTION OF THE DRAWINGS

The description herein makes reference to the accompanying drawings wherein like reference numerals refer to like parts throughout the several views, and wherein.

DETAILED DESCRIPTION OF EXAMPLES OF THE INVENTION

Referring to FIGS. 1-13, examples of an improved universal TPMS tool and methods are illustrated and described below.

Figure 1:
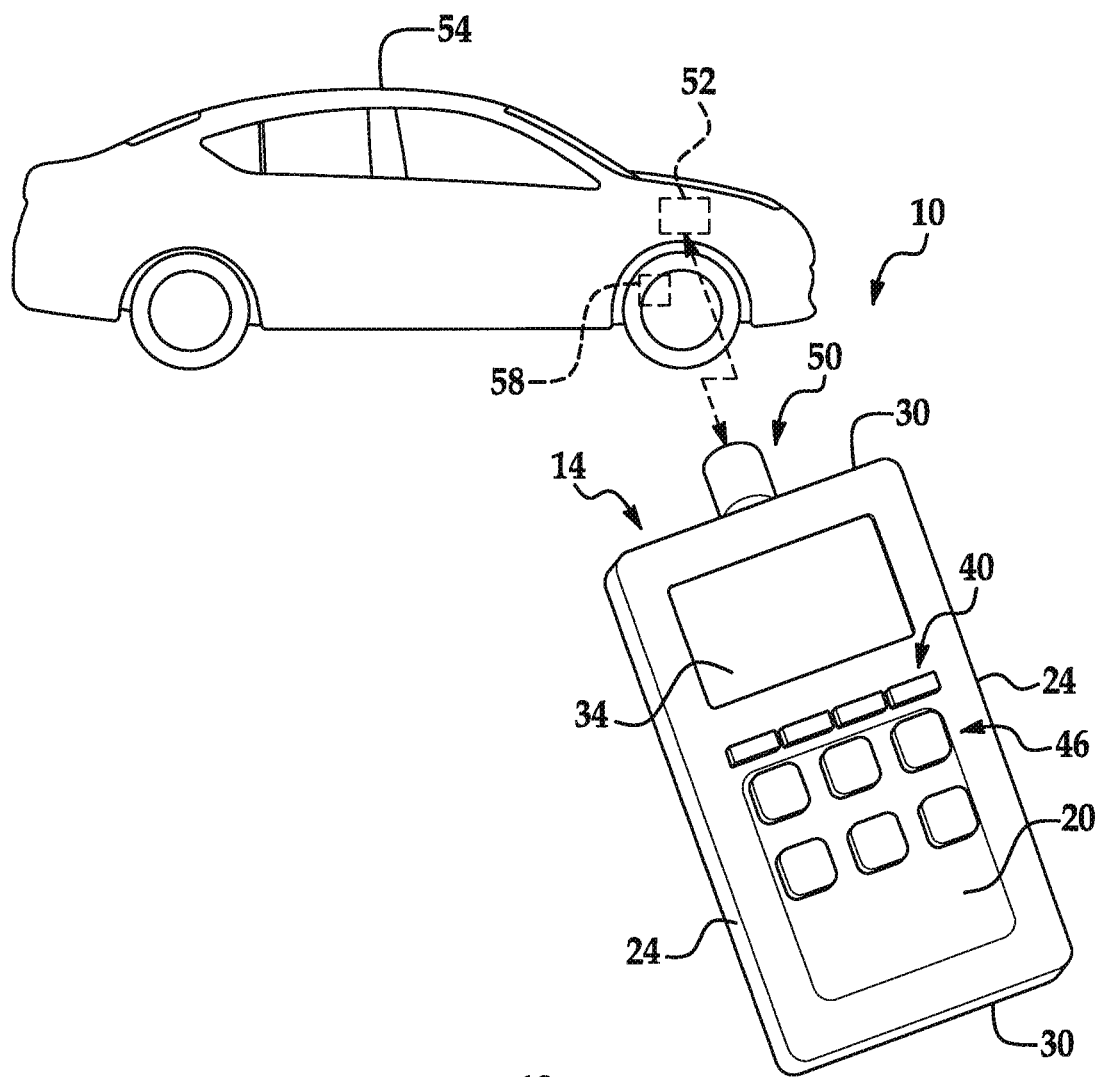
FIG. 1 is a perspective view of an example of a prior art TPMS tool for use with a passenger vehicle.
Figure 2:
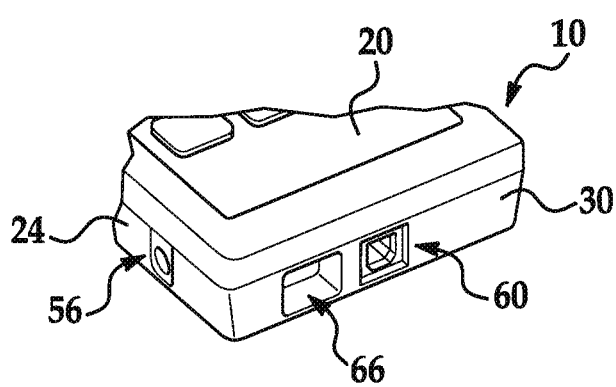
FIG. 2 is a partial perspective end view of the example TPMS tool in FIG. 1.

Referring to FIGS. 1 and 2, an example of a prior art tire pressure monitoring system (TPMS) tool for use with TPMS device installed in passenger vehicles is illustrated. Referring to FIG. 1, the exemplary TPMS tool 10 is a hand-held, mobile device including a housing 14 having front face 20, sides 24 and top and bottom ends 30. In the example, front face 20 includes a visual liquid crystal display (LCD) panel, several indicator lights 40, a pushbutton keypad 46 and an antenna 50. The antenna 50 is configured to communicate with a vehicle controller, such as an electronic control unit or module (ECU) 52 in a vehicle 54, which is in data communication with a tire sensor 58 installed in a pneumatic tire of wheel of the vehicle 54. In the example, antenna 50 is a low frequency (LF) antenna. Other antennas for transmitting and receiving other frequencies and signals known by those skilled in the art may be used. In a typical application, TPMS tool 10 is used to send, receive and process electronic data with a TPMS installed in a passenger vehicle by sending and receiving modulated or pulsed (continuous) wave signals. Whenever information is coded or decoded under the form of a modulated signal, a known in the art algorithm such as Manchester ASK or other type is used in accordance to a corresponding TPMS system communication protocol specification and implemented using the microprocessor 80 and a memory storage device 86. It is understood that the housing 10, front face 20, visual display 34 can take different configurations, forms and functions as known by those skilled in the field.

Referring to FIG. 2, exemplary tool 10 may include an AC or DC power connection, a first 60 and a second 66 data communication port for sending and receiving electronic signals and data from peripheral devices (not shown) or to the vehicle ECU through a wired connection. Other communication ports and connections known by those skilled in the art may be used.

Figure 3:
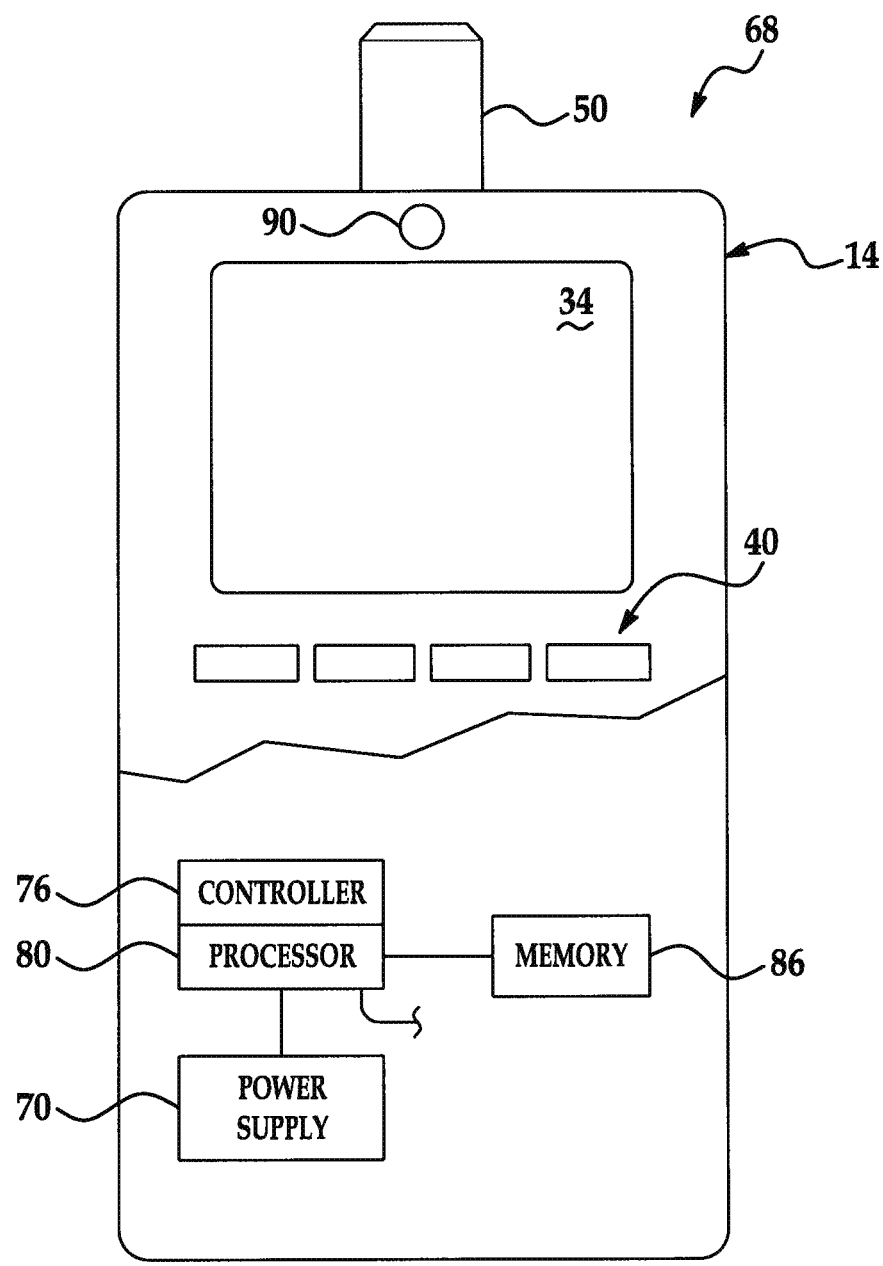
FIG. 3 is a schematic, partially cut-away illustration of an example of a TPMS tool of the present invention.

Referring to FIG. 3, exemplary tool 68 of the present invention may include an internal power supply 70 connected to a controller 76, a microprocessor 80 and a memory storage device 86. Power supply 70 may be conventional batteries, a rechargeable battery or other internal power means known by those skilled in the art. Where components in conventional devices may be used in the present invention, the same indicator numbers are used.

Figure 4:
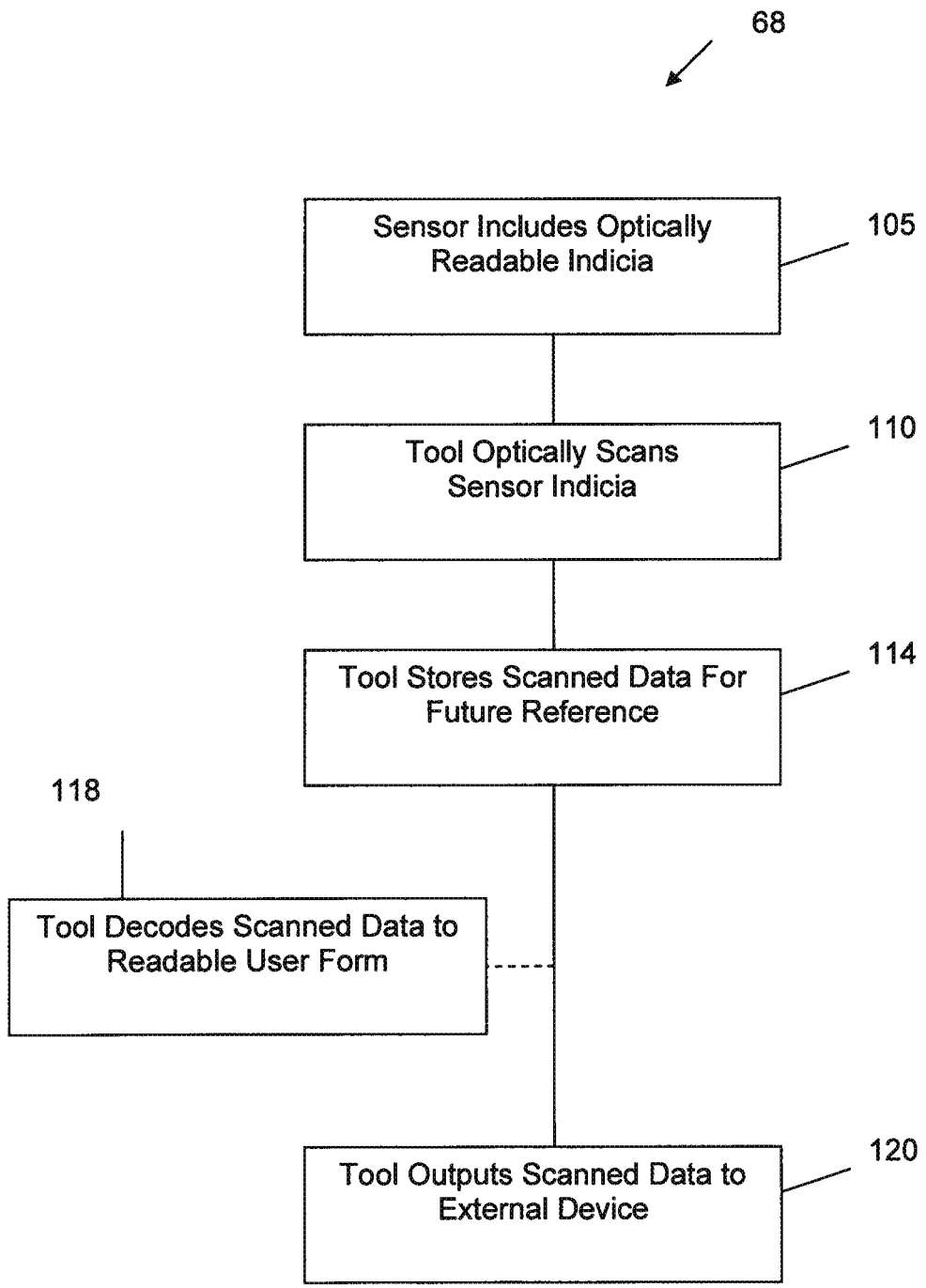
FIG. 4 is a schematic flow chart of an example of a method for optically reading indicia on a TPMS tire sensor.
Figure 5:
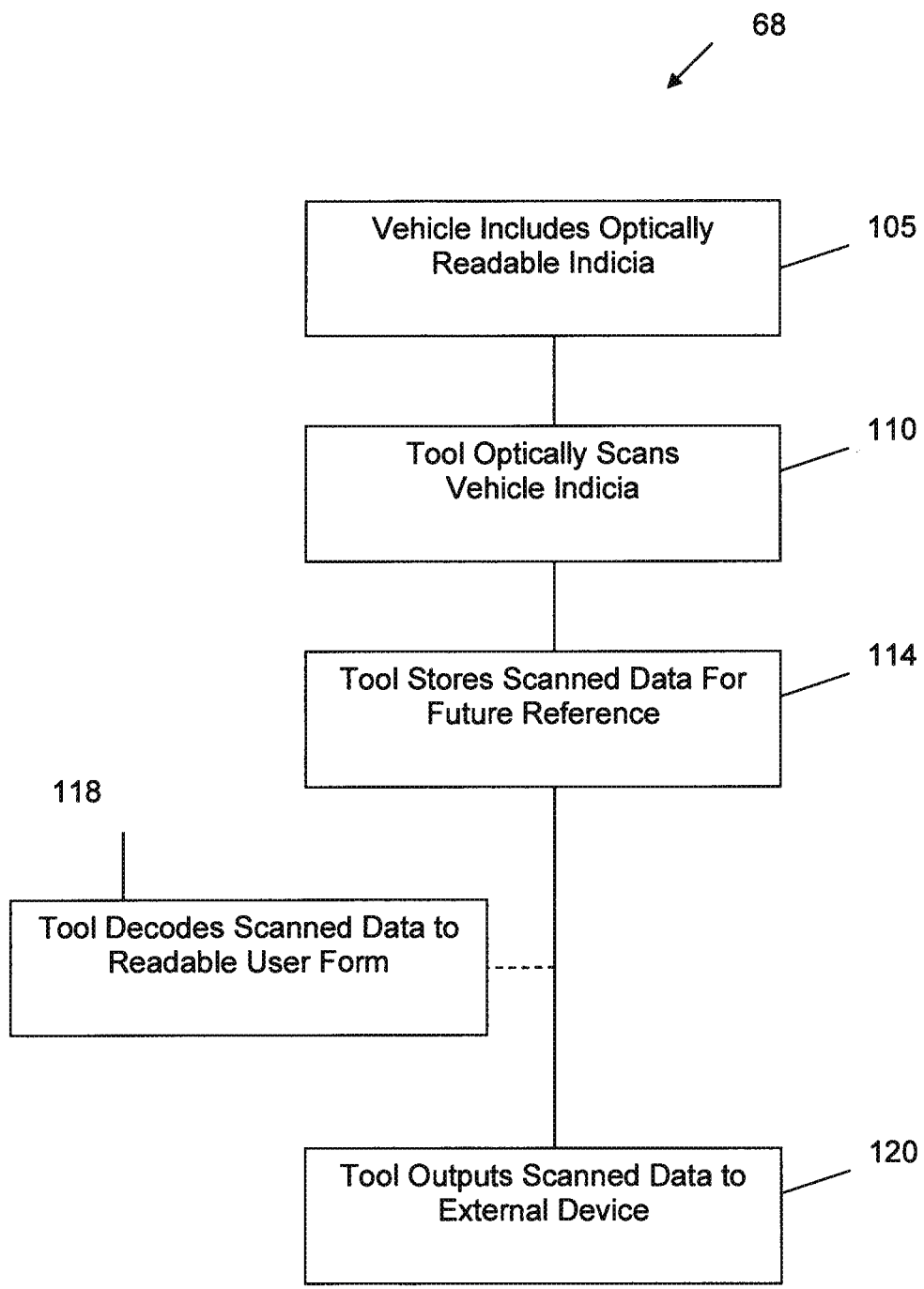
FIG. 5 is a schematic flow chart of an example of a method for optically reading indicia on a passenger vehicle containing useful information about the vehicle.

Referring to FIGS. 3, 4 and 5, an example of a tool 68 includes an optical scanner or camera 90 for use in directly scanning, reading or imaging information or data from a TPMS tire sensor itself (e.g., the tire sensor 58 of FIG. 1), the sensor packaging (stickers, labels, data sheets etc.) or other provided target. The scanner 90 is preferably positioned on the tool 10 front face 20 in an area that is easy for a user to position and align the scanner 90 with the indicia, for example a bar code or quick response (QR) code, on a target to optically scan, read, image and/or record the data on the indicia for use by the tool 68. In one example, the target with indicia in the form of a bar code, QR code or other scannable or readable indicia is a TPMS smart sensor (not shown). In one example, the sensor bar code includes the sensor's specific identification number (ID). In a preferred device and method, the scanner 90 is an infrared scanner. It is understood that other optical and/or laser sensors, readers, imagers and scanning devices and protocols known by those skilled in the art may be used.

In one example of the invention and scannable indicia on a target, the information included in the indicia can also be used to quickly select the right communication protocol, between the sensor and the tool, on the tool 68.

In conventional TPMS tool systems and applications, the tool 10 sends a signal to activate/trigger or awaken a TPMS sensor installed inside a pneumatic tire or wheel and the sensor responds and transmits a data signal to the tool 68. This signal fundamentally typically requires the sensor's specific ID number for use by the tool 68. Other information may be transmitted by the sensor, for example tire pressure and temperature, depending on the sophistication of the sensor. It is sometimes a problem in commercial service garages or areas of use, where the tool's activation signal also activates other devices in the immediate area and those devices send responsive signals which are picked-up by the tool 68 as well, or instead of the signal from the intended TPMS tire sensor. By directly reading and storing through optical scanning of indicia on a sensor or other target, the received data signal from the intended sensor can be compared to the directly scanned and stored sensor ID to, for example, filter only the relevant signal coming from this particular sensor among several signals or for verification of the data signal received. This will result in more accurate and verified data received by the tool 68.

In an application where a new TPMS sensor is to be installed in a wheel in a service garage, the tool 68 with scanner 90 can optically scan the sensor indicia to record and store the ID and other data in the tool 68 which can then be used to signal the vehicle ECU with that information to update and retrain (reprogram) the ECU. By direct scanning, the sensor does not have to be activated or awakened which conserves the battery life in the sensor. In another application, for example where a sensor has malfunctioned or has been damaged and needs to be replaced, it may be useful to clone or duplicate the dead sensor through use of commercially available programmable or ID-writeable sensors that are being introduced into the market. Examples of such programmable sensors include the Schrader EZ and Orange brand sensors. In the example, the dead or non-transmitting sensor is removed from the wheel, the dead TPMS sensor indicia is scanned by the tool 68 and a data signal is sent to the new sensor producing a cloned sensor having the same sensor ID and/or functions as the prior sensor.

In an exemplary process shown in FIG. 4, the target, for example TPMS tire sensor, includes the steps 104 of including optically readable indicia having useful data, 110 using tool 68 to optically scan the indicia, 114 store the scanned data in the tool memory 86, and 120 outputting the data directly to the ECU or to another device used to reload new sensor data to the ECU. In an optional step 118, the tool 68 decodes the data signal scanned and displays the data in a readable form for the tool user. Additional and alternate steps, as well as a different order of those steps known by those skilled in the art may be used. It is further understood that the target may include devices or components other than TPMS sensors as known by those skilled in the art.

Referring to FIG. 5, an example method of a method for scanning or reading other vehicle information using tool 68 is illustrated. In the example, the tool 68, through scanner 90, can be directed to read, scan and/or image and process, other visual targets or indicia, in the form of labels, stickers, plates or other tags on the vehicle which include useful information about the vehicle or its systems in a similar manner to that described in FIG. 4. For example, the target indicia may include the vehicle identification number (VIN) which is unique to that vehicle. In one example, when a TPMS sensor ID is read or recognized by tool 68, this information can be compared to the recently scanned or stored VIN to ensure that the correct TPMS tire sensor has been read versus, for example, another TPMS sensor that was in close proximity to the vehicle in a service garage. Scanning of other useful vehicle information, for verification, storage in TPMS tool 68 and/or transfer of information from tool 68 to other devices known by those skilled in the art may be used. In one example, optical character recognition (OCR) techniques, processes and/or comparisons may be used to read, scan, image or interpret the indicia for use by the tool 68 and/or visual display to the user. These individual and combined features are highly advantageous to technicians and service centers for rapidly obtaining information from the vehicle, the vehicle TPMS and other vehicle systems. For example, data can be stored and later referenced providing a useful history on service to that vehicle and print reports of present service for use by the service center and the end customer.

Figure 6:
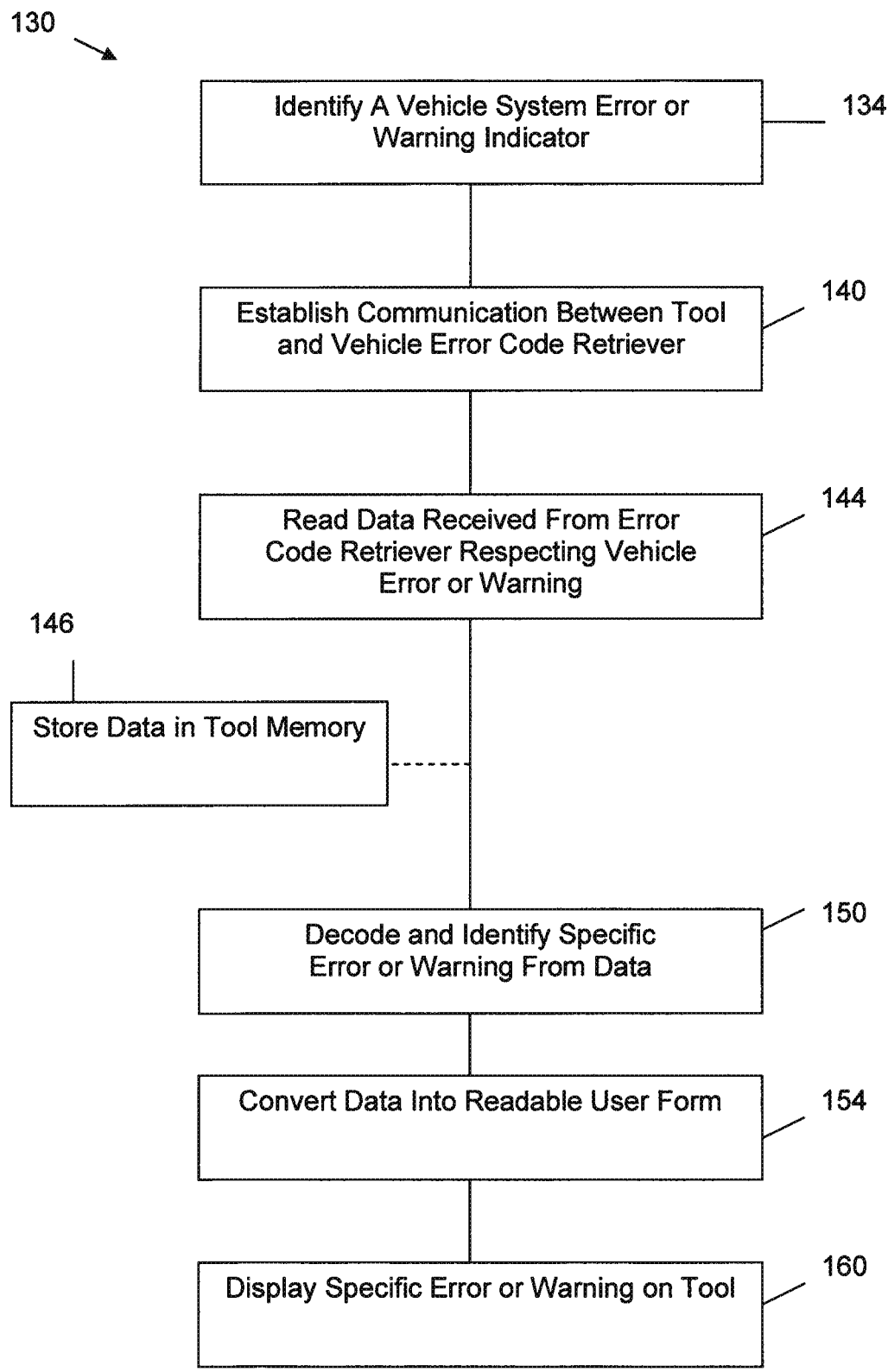
FIG. 6 is a schematic flow chart of an example of a method for retrieving error codes for numerous vehicle systems.

Referring to FIG. 6, a method of using tool 68 to retrieve and decode vehicle error or alert codes, for example DTC (diagnostic trouble codes), or other important vehicle identification or conditions, for example, VIN number, vehicle mileage and other indicators used by technicians, as well as TPMS and other vehicle warning or error systems is illustrated.

In an example for use with TPMS, in many conventional TPMS applications, there is only one indicator/alert light on the vehicle instrument panel to alert the driver of an important tire condition, for example, a sensor in one of the tires that has stopped functioning due to a dead battery or damage. These conventional systems and single indicator light do not provide vital information such as which of the four tires has the inoperable sensor, or which tire is low on air pressure. Typically, this more detailed information is available through the signals sent by the sensors to the ECU. It would be highly beneficial for the tool 68 to be able to access these sensor data signals, or the ECU, and decode this information to greatly assist a technician or end user to identify the problem or error and correct it.

This process could also be used for other vehicle warning or alert systems, for example, vehicles and their ECUs often have alert signals and indicators for oil changes (for example the electronic notice to change the engine oil every 3000 miles), service on a vehicle's electric park brakes (sending a signal to the ECU to release the vehicle park brake so they can be disassembled and serviced) and other applications which commercial service garages are called on to service problems on vehicles. These other applications or features may include for example, to activate/deactivate collision avoidance devices, check the condition of oxygen sensors or EGR valves, or check basic operative functions of other devices mounted on the car. Other applications known by those skilled in the art may be checked or interfaced with tool 10.

FIG. 6 provides an example of a process for retrieving and decoding vehicular data signals 130. In step 134 a vehicle system error or status indicator in need of decoding is identified. Step 140 establishes communication between the tool 68 and the vehicle alert system, for example the TPMS, or ECU in communication with that system. The data or signal is received by the tool in step 144 wherein the data is decoded and the specific error or alert is identified in steps 144 and 150. In steps 154 and 160, the error code data is compared to a database, located either in the internal memory 86, memory extension such as SD-card or wirelessly accessible by the tool 68, and converted into readable form for the user and displayed on the visual display 34 of tool 68 in multiple human languages.

The same principle can be used to display non-error related information, but useful information, to a driver on the display 34, for example tire pressure, tire temperature on all four tires, etc.

As shown in FIG. 5, other useful information scanned or read from vehicle indicia tags or labels can also be displayed on tool screen display 34 and/or transferred or stored for processing, generation of technician or end user reports, historical data on the vehicle or for future reference by the service garage or technician.

Figure 7:
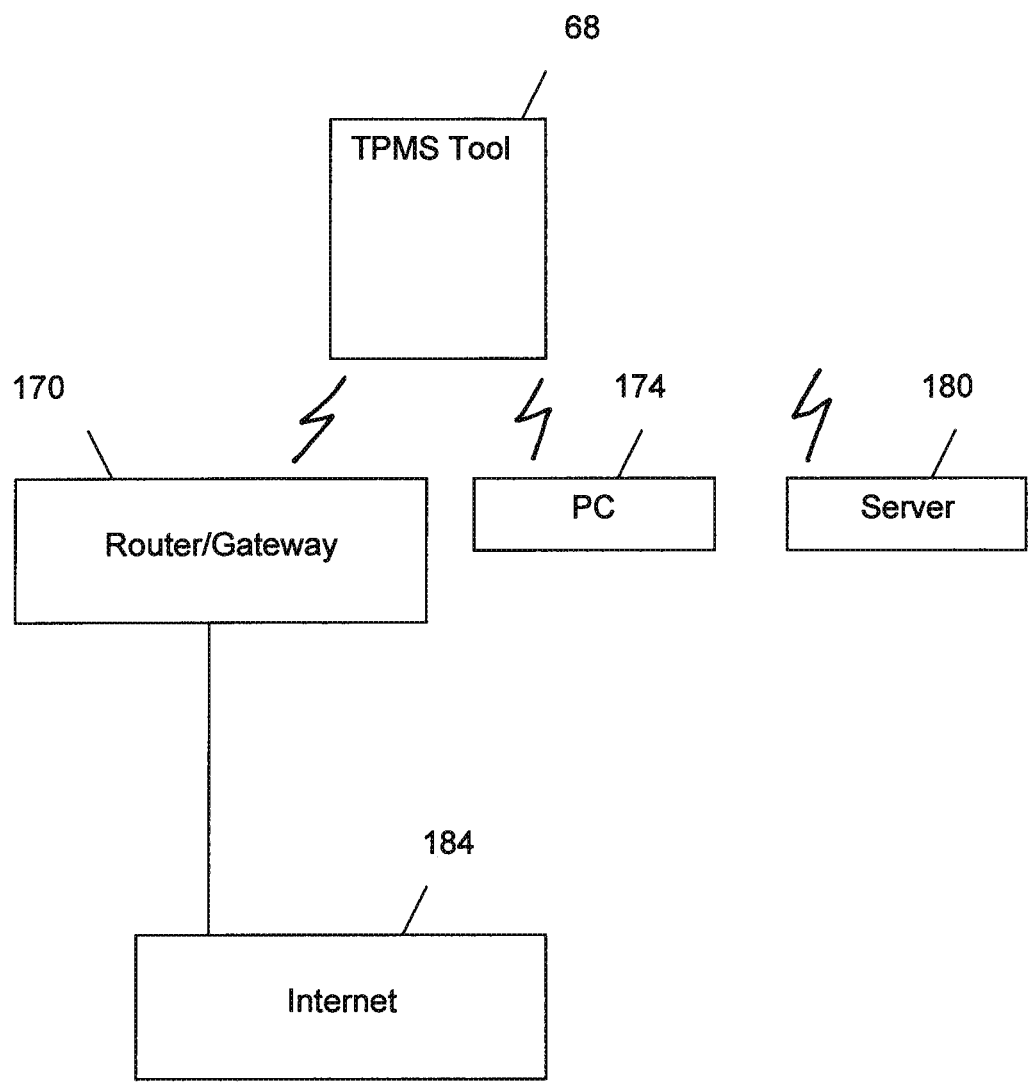
FIG. 7 is a schematic illustration of a TPMS tool using wireless technology for software and other updates.

Referring to FIG. 7, an example of improved tool 68 includes components and functions to communicate wirelessly to receive and/or download electronic data from a peripheral device or the internet to update or upgrade the programmable software or retrieve protocol or data information to be stored in memory 86 or processor/controller 76/80 in tool 68. It can also be used to send feedback information such as error or validation information from the tool 68 to a remote server.

It is common for the various TPMS sensor manufacturers to use different or proprietary protocols for accessing the sensors and to instruct the sensors to initiate a function, for example sending a data signal with the sensor's ID to a tool 68. In order for a true universal tool 68 to be able to communicate with all, or substantially all, of the existing and TPMS tire sensors, the software on the tool 68 needs to be periodically updated so the tool 68 can effectively communicate with newer sensors thereby avoiding rapid obsolescence. Typical environments of commercial service garages are not always well-suited for the typical hardware allowing direct wire connection of a tool 68 to a PC or other device to directly upload software updates from the PC to the tool 68. It would be highly advantageous if the tool 68 can access and receive updates wirelessly over a reasonable area of the commercial garage or adjacent office. Increased efficiency can be achieved if the technician, on encountering a new sensor that the tool 68 cannot communicate with, can quickly activate the wireless update and upload any new updates right from the shop floor.

In the example shown in FIG. 7, the TPMS tool 68 is equipped with hardware and software for wireless communication through one of the conventional wireless protocols, for example Bluetooth, Wi-Fi, GSM or any other wireless communication network. The tool 68 is placed in electronic communication with a router 170 in communication with the internet 184, or PC 174 or server 180, to wirelessly receive data from these devices for storage of the data in the tool 68 or in related memory extension(s). In one example, the tool software automatically searches for updates at regular intervals, for example, once per day or week. In an alternate example, a technician user may manually initiate a search and download available updates stored on a server or PC or directly from the internet. In another example, after reading information from defective TPMS sensor, the tool 68 can automatically download from the internet relevant program data to clone a new programmable TPMS sensor in accordance with defective sensor information. Online access has the double advantage of always providing the most up-to-date available information and accessing to unlimited memory size without the need of large internal memory space.

In one example of tool 68, the tool memory 86 stores data providing audio and/or visual troubleshooting instructions and/or data to the processor/controller 76/80 for audio and/or visual display on display screen 34 for technicians and end users. In one example, the troubleshooting instructions provide predetermined instructions and guidance to resolve scenarios where the tool 68 is not successfully sending or receiving data from the TPMS sensor or electronic control unit. In the example, a user accesses the stored troubleshooting data from the tool memory that is particular to the problem experienced with the tool 68. An index or menu of available troubleshooting data and procedures may be included. It is understood that additional method steps, memory, online connection and processor configurations and access protocols for the stored troubleshooting data known by those skilled in the art may be used.

Figure 8:
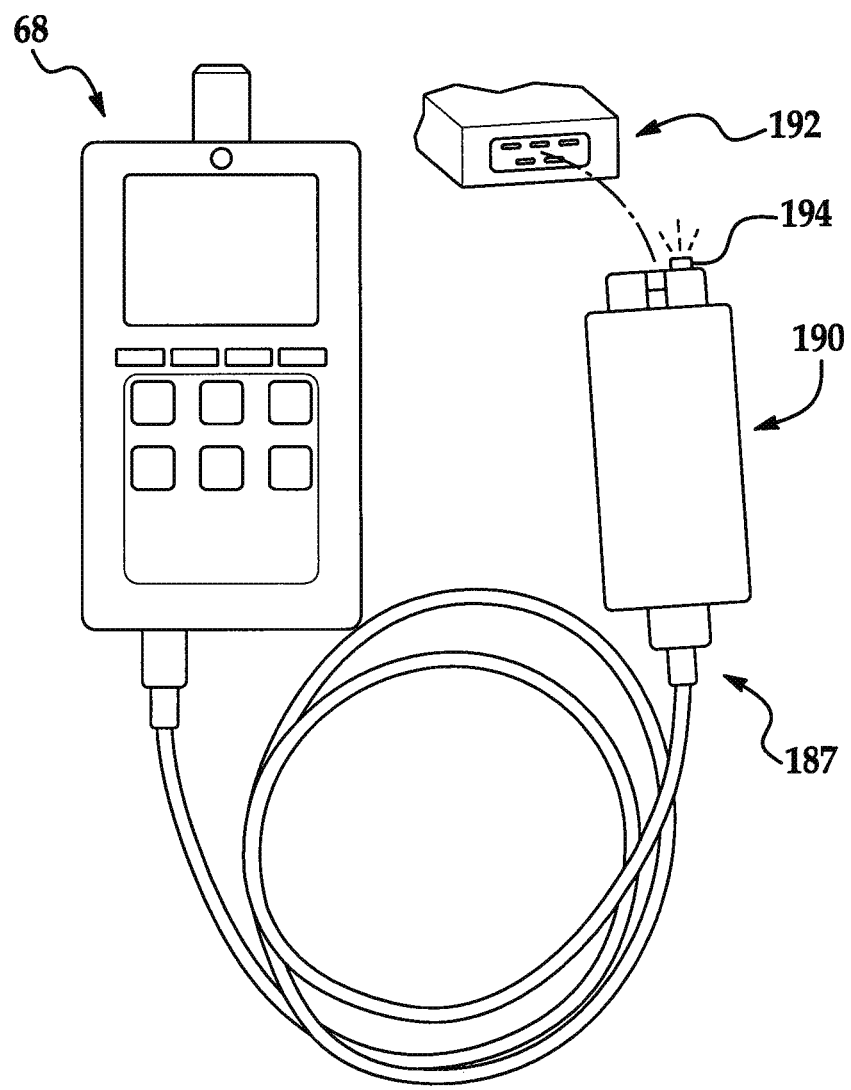
FIG. 8 is a perspective view of an example of a TPMS tool with an OBDII communication accessory.

In another example of tool 68 shown in FIG. 8, the tool 68 uses an exemplary OBD connector 187 which connects to the housing 14 and includes a connector 190 for use in connecting to a OBDII connection point or connector 192 typically installed in the vehicle passenger compartment. In the example, the connector 190 includes an illumination device or lamp 194 near the distal end which connects to the vehicle OBDII connector 192. The illumination device 194 is positioned and oriented to provide illumination to assist the technician or end user in connecting the tool 68 or its accessory or OBD connector to the vehicle mating OBDII connector 192 which is often subject to low light conditions, placed below the instrument panel in the vehicle passenger compartment. The illumination device 194 may be an LED lamp included in the tool housing or in the accessory OBD connector 190 connected to the tool 10 and extends to aid in the connection of the tool 68 to the OBDII 192 or other communication port connected to the ECU. The illumination device 194 is selectively activated to provide the user additional light. In a preferred example, the illumination device 194 is automatically activated or illuminated, for example when the accessory 187 is connected to the tool 68, and automatically shuts off when the connector 190 is connected to OBDII connector 192. Other examples for activation and deactivation of the lamp 194 known by those skilled in the art may be used. It is understood that other lamps and illumination devices, including placement and orientation on the tool 68 or other devices known by those skilled in the art may be used.

Figure 9:
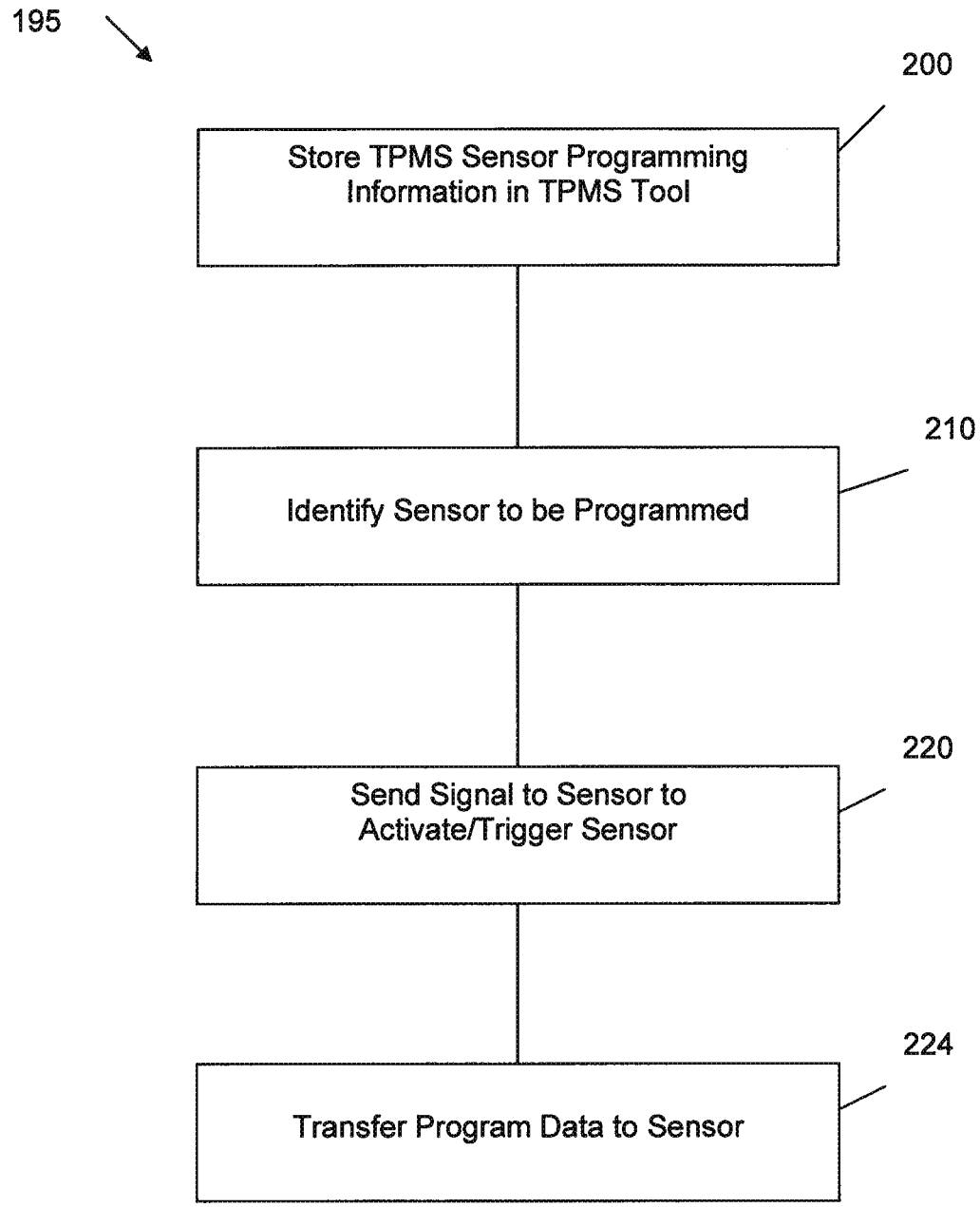
FIG. 9 is a schematic flow chart of an example of a method for programming TPMS sensors using a TPMS tool.

In the example shown in FIG. 9, an example of a method 190 for using tool 68 for programming a programmable TPMS sensor is illustrated. As disclosed in the example shown in FIG. 3, the exemplary tool 68 can be used to program a programmable TPMS sensor, for example for example a Schrader EZ sensor or an Orange brand sensor. Prior programming TPMS devices were dedicated to programming a specific manufacturer's sensor. The example of the present universal TPMS tool inventive method 195 includes the step 200 of storing software of coding to program several, and preferably all, programmable TPMS sensors so that the sensors can operate in a particular vehicle or ECU. Step 210 identifies the sensor to be programmed. This may be done in several ways known by those skilled in the art. In one example, the sensor is optically scanned through scanner 90 as shown in FIG. 3. Alternately, information may be input manually to, for example, select the type of sensor from preprogrammed selections in tool 68 memory 86. In step 220, the tool 68 sends a signal to active or awaken the sensor and in step 224, the tool 68 transmit through a modulated wave or through direct electrical contact a signal or signals to program the sensor with the predetermined data.

Figure 10:
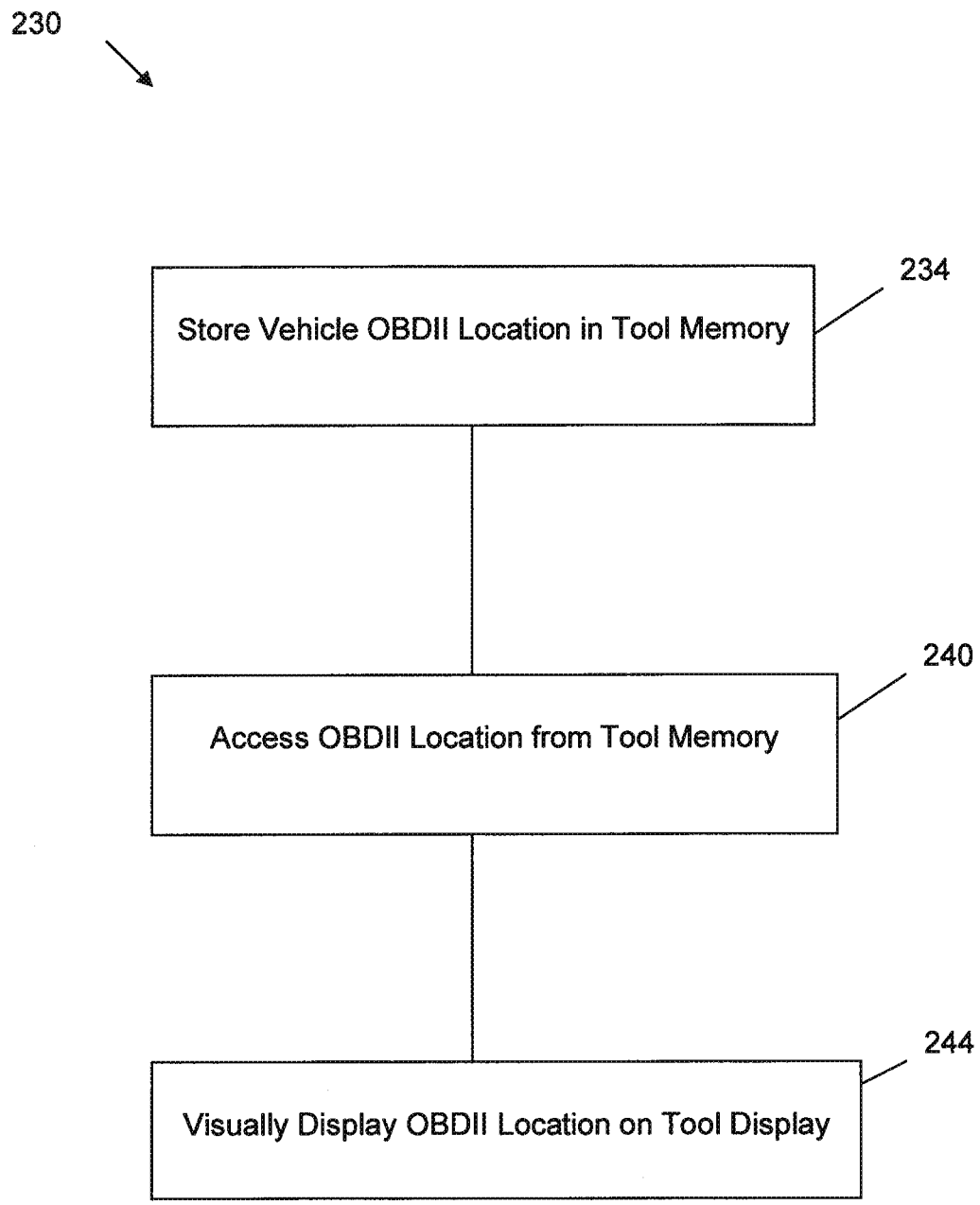
FIG. 10 is a schematic flow chart of an example of a method for storing and retrieving OBDII information in a TPMS tool.

In FIG. 10, an example of a method 230 of using tool 68 to assist a technician or end user to identify the OBDII location or connector 192 (see FIG. 8) in a passenger vehicle. In vehicles equipped with TPMS, a connection point, typically an electronic port connector, for example a standard OBDII connector 192, or any other type connector is positioned below the instrument panel in the passenger compartment. The OBDII connection point is in electronic communication with the vehicle ECU allowing access to TPMS information, for example error codes sent from the TPMS tire, and alternately other vehicle, sensors and systems. Not all vehicle OEMs position the connection point 192 in the same place which is disadvantageous and time consuming even for experienced technicians to efficiently locate the connection port so that the tool 68 can be connected to the vehicle and either program the ECU with new sensor information or access error codes as described in the example above. It would be advantageous to provide a TPMS tool 68 with the location information per vehicle which can be access by a technician or end user to quickly locate a particular vehicle's OBDII connection point.

In method 230, step 234 includes storing the OBDII 192 location data for particular vehicle models in tool 68 memory 86. In step 240, the technician or end user accesses the location information through a dedicated button on front face 20, selection through a preprogrammed menu on display 34 or through other methods known by those skilled in the art. Step 244 provides a preprogrammed visual display of the OBD connector location 192 on the tool 68 visual display 34.

Figure 11:
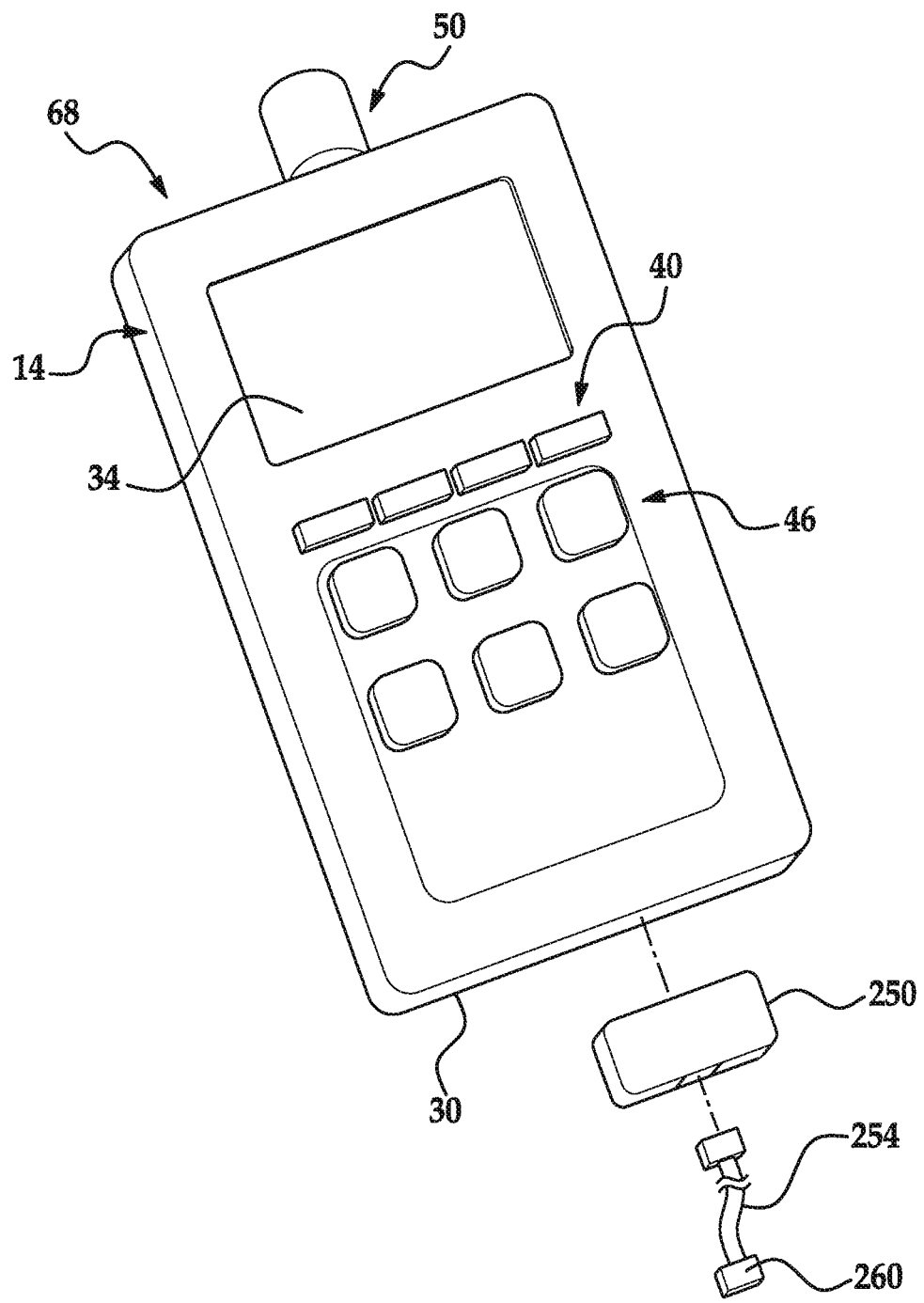
FIG. 11 is a schematic illustration of a detachable OBDII module for use with a TPMS tool.

Referring to FIG. 11, an example of a detachable OBDII connection module 250 is schematically illustrated. In prior devices, a separate OBDII connector or connector module, for example 187 shown in FIG. 8, was connected through a cable to the tool 68. The connector module included a connector or plug 190 which electronically connected to the OBDII connection point 192 in the passenger compartment as described above. This required the tool 68 to be positioned inside the vehicle compartment subjecting the tool 68 to damage and loss if, for example, the commercial technician mistakenly leaves the tool 68 in the vehicle resulting in damage or complete loss of the tool 68. In another example not shown, the module 250 can include an alarm or other device in the tool which can sound an audible alarm if the paired tool 68 and OBDII accessory 250 are, for example, more than 10 yards apart, as another device to assist in the prevention of technicians leaving the OBDII accessory 250 in the vehicle once the garage service of the vehicle is complete. Other alarm or indication devices, for example, a high intensity flashing light, known by those skilled in the art may be used.

In the example shown, the detachable OBDII module 250 is preferably connected to the tool 68 housing 14 and in electronic communication with the tool controller 76, controller 80 and memory 86. In operation, while the tool 68 is transmitting and receiving information from the TPMS tire sensor or other vehicle sensors or systems, the module 250 is connected to housing 14 and stores the information to be transmitted from tool 68 to the vehicle OBDII connector 192 and to the ECU. Once the tool 68 has transmitted all of the data for the particular TPMS calibration or adjustment, the module 250 is electronically detached from housing 14. An electronic cable 254 is connected through a port in module 250 having a connector 260 on the opposing end compatible with the vehicle OBDII connection point. In the example, without having to position the tool 68 into the vehicle, the relatively small and inexpensive module 250 may be positioned in the vehicle and connected to the vehicle OBDII connection point 192 to transfer the TPMS recalibration data from the tool 68 to the vehicle ECU for the appropriate TPMS or other vehicle system recalibration, reset or other condition as known by those skilled in the art.

In one example, the module 250 includes memory which can store instructions and data when connected to tool 68 for transfer of the data or other instructions to the ECU on connection of the module 250 to the OBDII connector 192. In another example, the module 250 is simply placed in electronic wireless communication with the tool 68. Once the module 250 is connected with the OBDII connector 192, the tool 68 wirelessly transfers instructions or data to the module 250 for transfer to the ECU. Other configurations and operations known by those skilled in the art may be used.

Although schematically illustrated module 250 is shown as being connected to bottom end 30 of housing 14, it is understood that module 250 can take many forms, for example a memory card which is inserted into a receptacle or connector, or other devices capable of transferring electronic data as known by those skilled in the art. Module 250 can also be connected in other areas to tool 68 housing 14 as known by those skilled in the art. It will also be understood that module 250 can alternatively be connected to other devices such as computer or mobile phone (Smart phone, iPhone, Blackberry or any other). In some tasks such as retrieving error codes from ECU or calibrating TPMS ECU with known sensor IDs, the use of a tool 68 may not be necessary and a mobile phone or computer may be used directly to communicate with the module 250 and the ECU, through either a wired or wireless connection, for example. Such features can be particularly advantageous, for example, where the TPMS system needs to be updated and the ECU retrained or reprogrammed to take into account a change in wheel or wheels and the respective different TPMS wheel sensors after a user switches from one set of tires to another. Such devices can further include appropriate programming to decode the data from the module 250 and display the data in a readable form. In one example with respect to error codes, the tool 68 or smart phone with a TPMS or suitable application could further act as a warning indicator by vibrating or otherwise creating an audio, visual and/or tactile alert.

It is also possible to have module 250 equipped with wireless capability such as Bluetooth or Wi-Fi or other wireless communication means known by those skilled in the art rather than the connector 260 to communicate wirelessly with the tool 10 or other the other devices such as various models of computers or mobile phones.

Figure 12:
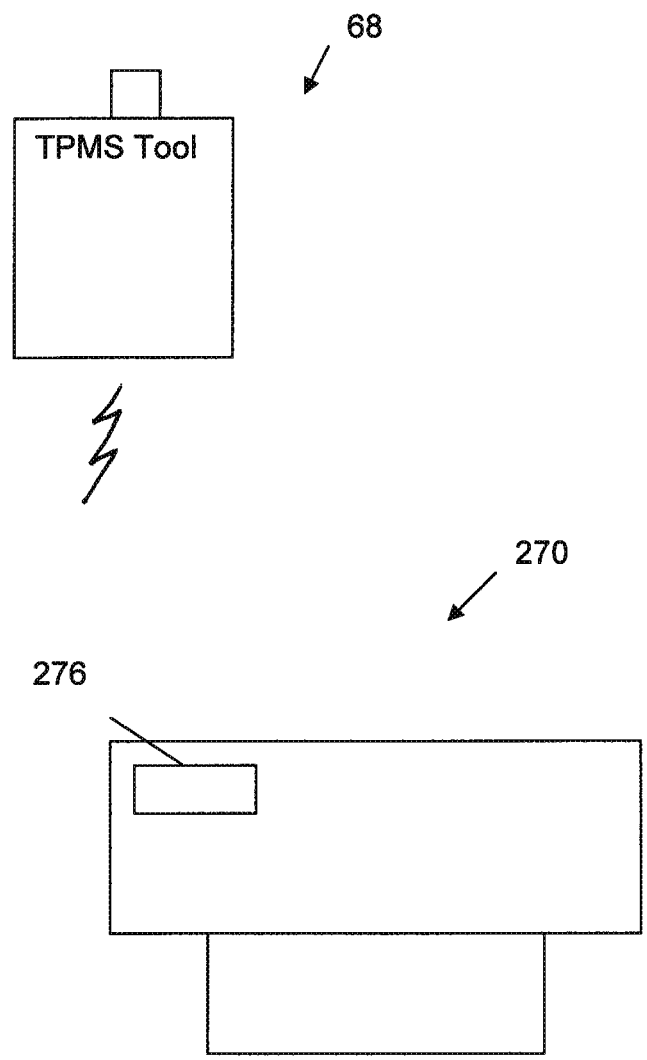
FIG. 12 is a schematic illustration of a TPMS tool for wireless communication with an exemplary peripheral device in the form of a printer.

Referring to FIG. 12 an example of tool 68 in wireless communication with an exemplary peripheral device, for example a printer 270 or an OBDII module, is illustrated. Prior TPMS tools have disadvantages of requiring cables to connect the tool 68 to peripheral devices including printers in order for technicians to end users to print out data and reports from the tool 68. In the example, tool 68 utilizes infra-red (IR) transmitter, antenna 50 or other internal antenna (not shown) to transmit data through IR, Bluetooth, Wi-Fi or other wireless transmission protocols described above to electronically transmit data from the tool 68 to the printer 270. Other hardware, software and communication protocols known by those skilled in the art may be used. In one example, the printer 270 includes a port 276 which permits the tool 68 to directly or indirectly connect to charge the tool 68 power source 70, for example a rechargeable battery. It is understood that other peripheral devices in wireless communication with tool 68 known by those skilled in the art may be used with the tool 68.

Figure 13:
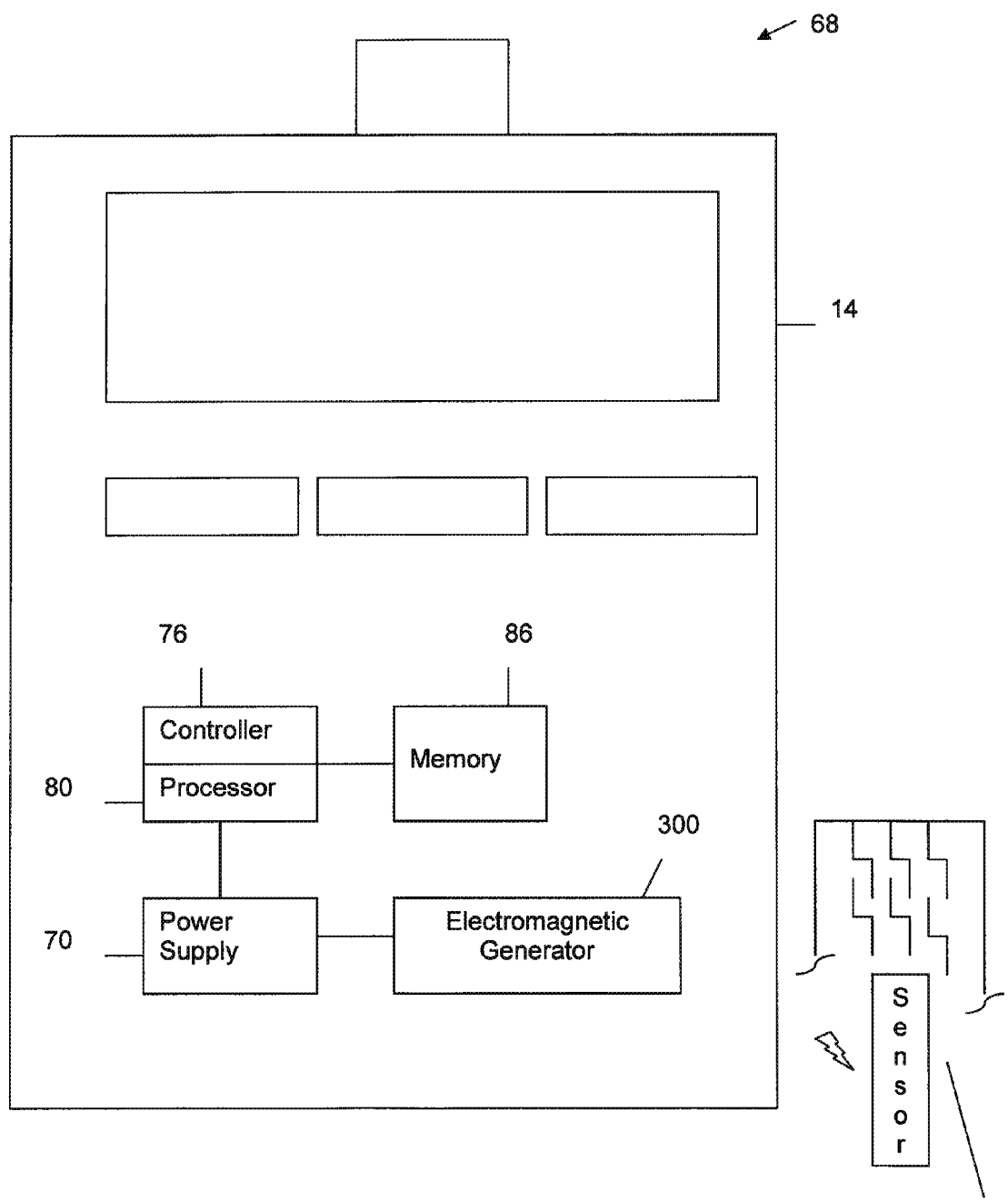
FIG. 13 is a schematic, partially cut-away example of a TPMS tool with an exemplary power source to power a TPMS wheel sensor.

Referring to FIG. 13 an example of tool 68 useful in providing a remote power source to provide power to a remotely positioned TPMS tire sensor is illustrated. It is contemplated that TPMS sensors described above may be manufactured to become battery-free and eliminate the need for a finite life battery source, but rather than rely on an exterior remote power source to send energy to activate the sensor and enable transmission of the sensor data to the ECM and/or tool 68. In the example, tool 68 includes an electromagnetic generator 300 in electrical connection with the tool 68 power supply 70.

In one example, the generator 300 is selectively activated to generate an electromagnetic field wherein on placing the tool 68 in close proximity to a vehicle tire and tire sensor 358, induces an electrical current in the sensor sufficient to power the sensor and activate or trigger the sensor 358 as described above to read the predetermined characteristics of the tire and transmit the electronic signals to the ECU or tool 68 for further processing as generally described above and known by those skilled in the art. It is understood that other devices and mechanisms to provide a power source to the sensors or other "battery-free" TPMS devices may be used as known by those skilled in the art.

It is contemplated that a separate power source (not shown) having a generator 300, or other power source, could be connected to and communicate with tool 68, for example like module 250 described above, to provide and transmit the power source to the sensor as generally described above. Other configurations and methods known by those skilled in the art may be used.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A hand held tire pressure monitoring system (TPMS) tool for use with a vehicle including an electronic control unit (ECU) in communication with a plurality of TPMS tire sensors operable to detect a condition of a vehicle tires and transmit the tire condition data, the tool comprising:
   a housing;
   a processor and a memory storage device positioned within the housing;
   a key pad positioned on the housing in communication with the processor for input of commands;
   an OBD device having at least one connector for selective engagement of the OBD device to the tool and an OBD connector onboard a vehicle, the OBD device comprises an OBD module having a memory device for storing data received by the tool from a TPMS tire sensor, wherein the OBD module is selectively disengaged from the tool prior to engagement with the vehicle OBD connector for transfer of the stored data to a vehicle ECU; and
   an antenna for transmission and receipt of electronic information from the plurality of TPMS tire sensors.

2. The tool of claim 1 wherein the OBD device comprises an OBD connector removably connectable to a data communication port in the housing, the OBD connector having an illumination device proximate an end connectable to the OBD connector onboard the vehicle for selective illumination of the OBD connector onboard the vehicle.

3. The tool of claim 1 wherein the tool memory device includes instructional data on the location of the OBD connector onboard the vehicle for a plurality of vehicle models for display on a tool visual display screen.

4. A method of communicating data between a hand held TPMS tool and the electronic control unit (ECU) of a passenger vehicle, the tool having an antenna, a receiver, a processor, a data communication port, and a memory storage device, the method comprising the steps of:
   receiving TPMS tire sensor data from at least one TPMS tire sensor through the tool receiver;

selectively placing an OBD module having a memory storage device in data communication connection with the tool data communication port;

storing the received TPMS tire sensor data in the OBD memory storage device;

terminating the data communication connection between the OBD module and the tool;

selectively placing the OBD module in data communication connection with the vehicle ECU separate and independent of the tool; and transferring the TPMS tire sensor data from the OBD module memory storage device to the vehicle ECU.

5. The method of claim 4 wherein the OBD module further comprises a cable having a connector for connection to the tool data communication port, the method further comprising the steps of:

connecting the OBD module cable and connector to the tool data communication port prior to transferring and storing TPMS tire sensor data in the OBD module memory storage device; and disconnecting the OBD module cable and connector from the tool data communication port prior to connecting the OBD module to the vehicle ECU thereby eliminating the need to place the tool in the vehicle in order to transfer the TPMS tire sensor data to the vehicle ECU.

6. A method of processing TPMS tire sensor data of a vehicle using a hand held portable TPMS tool having a housing, an antenna, a receiver, a data processor, a memory device, a memory storage device, the method comprising the steps of:

receiving through the tool receiver TPMS tire sensor identification information from a first TPMS tire sensor;

storing the received first TPMS tire sensor identification information in the tool memory storage device;

receiving identification information for a programmable second TPMS sensor;

accessing preprogrammed instructions in the tool memory device for communicating data to the programmable second TPMS tire sensor;

comparing the received second TMPS sensor identification information to a database of TPMS sensors stored in the tool memory device;

selecting at least one of an appropriate communication protocol or programming data for the identified programmable second TPMS sensor stored in the tool memory device for transmission to and receipt and registration of the first TPMS sensor identification data by the programmable second TPMS sensor;

transmitting through the tool antenna a signal to the second TPMS tire sensor to activate the second TPMS sensor, adapting the second TPMS sensor to receive and register data; and transmitting through the tool antenna the received and stored first TPMS sensor identification information to the second TPMS sensor for registration of the first TPMS sensor identification in the second TPMS sensor whereby the second TPMS sensor functions under the first TPMS sensor identification.

7. The method of claim 6 wherein the step of receiving sensor identification from the first TPMS sensor further comprises the step of optically scanning by an optical scanner connected to the tool indicia including embedded electronic data positioned on the first TPMS tire sensor including the first TPMS tire sensor identification data.

8. The method of claim 6 wherein the step of receiving identification information for the programmable second sensor further comprises the step of:

optically scanning electronic data embedded in indicia for the programmable second TPMS tire sensor through an optical scanning device connected to the tool.

9. A method of processing TPMS tire sensor data of a vehicle using a hand held portable TPMS tool having a housing, an antenna, a data processor, a memory storage device and an a manual data input button, the method comprising:

receiving vehicle identification information from a vehicle through the tool receiver;

storing the received vehicle identification information in the tool memory storage device;

accessing a preprogrammed database of at least one of TPMS or electronic control unit (ECU) communication protocols by vehicle type in the tool memory storage device;

comparing the received and stored vehicle identification information in the tool memory storage device to the at least one of TPMS or ECU communication protocols by vehicle type; and selecting the appropriate at least one of the TPMS or ECU communication protocols and instructions for the tool to communicate with at least one of the vehicle TPMS tire sensors or vehicle ECU;

the tool receiving a vehicle system error code signal from the vehicle ECU;

accessing a database of manufacturer vehicle error codes and error code information stored in the tool memory device;

selecting the appropriate error code information from the error code database;

decoding the received system error code into a human understandable form; and communicating the decoded system error code to a user through a tool display.

* * * * *